United States Patent

Mead

[15] 3,674,128

[45] July 4, 1972

[54] FEEDER FOR CYLINDRICAL OBJECTS

[72] Inventor: Dennis E. Mead, Cazenovia, N.Y. 13035

[22] Filed: Feb. 11, 1970

[21] Appl. No.: 10,529

[52] U.S. Cl. ....................198/33 AA, 221/167
[51] Int. Cl. ....................B65g 47/24
[58] Field of Search ....................198/33 AA, 30; 221/169, 167, 221/168; 133/8

[56] References Cited

UNITED STATES PATENTS

| | | | |
|---|---|---|---|
| 3,508,639 | 4/1970 | Braden | 198/33 AA |
| 2,777,561 | 1/1957 | Rose | 198/33 AA |
| 2,800,993 | 7/1957 | Baskin | 198/33 AA |
| 2,763,400 | 9/1956 | Francis | 133/8 |
| 2,065,319 | 12/1936 | Lewis | 221/168 |
| 2,853,176 | 9/1958 | Kay | 221/167 |
| 3,277,996 | 10/1966 | Thurston | 198/33 AA |

FOREIGN PATENTS OR APPLICATIONS

| | | | |
|---|---|---|---|
| 920,763 | 3/1963 | Great Britain | 198/33 AD |

*Primary Examiner*—Richard E. Aegerter
*Attorney*—Cumpston, Shaw & Stephens

[57] ABSTRACT

Cylindrical objects are fed from a rotating disk that is tilted 10° to 15° from the horizontal. The objects are dropped onto the upper part of the disk, and a fixed orienting surface close to the top surface of the disk curves inward from the periphery of the disk in the direction of rotation and extends across the lower part of the disk to a discharge region where the orienting surface is approximately radial to the disk. Objects that are properly oriented for discharge roll against the disk in sliding contact with the orienting surface and pass through a discharge tube. Objects in other orientations frictionally engage the disk to be carried away from the discharge tube, guided around the disk, and tumbled into a new approach to the orienting surface.

16 Claims, 3 Drawing Figures

INVENTOR.
DENNIS E. MEAD
BY Cumpston, Shaw and Stephens
ATTORNEYS

FEEDER FOR CYLINDRICAL OBJECTS

THE INVENTIVE IMPROVEMENT

Many sizes and shapes of cylindrical objects must be fed automatically to machinery, and many suggestions have been made for equipment to accomplish such feeding. However, the feeding of cylindrical objects is not as simple as it appears, and previous devices have suffered many disadvantages.

The invention involves the recognition of all the requirements for a successful device for feeding cylindrical objects, and proposes a simple solution meeting these requirements. The invention aims at simplicity, reliability, high speed and versatility.

SUMMARY OF THE INVENTION

The inventive device for orienting and feeding generally cylindrical objects uses a disk that is rotated about its perpendicular axis with the disk tilted from the horizontal and the cylindrical objects dropped onto the upper region of the disk. The objects are confined within the periphery of the disk, and a fixed orienting surface close to the top surface of the disk curves inward from the periphery of the disk in the direction of rotation and extends across the lower region of the disk to a discharge region where the orienting surface is approximately radial to the disk. A tube is aligned with the orienting surface at the discharge region to extend beyond the disk periphery to receive the objects. Preferably, a barrier surface keeps the objects from the central region of the disk, a tripping rod is arranged rotationally ahead of the orienting surface, the discharge tube is rotated, and a guide surface rotationally beyond the discharge region curves inward in the direction of rotation and terminates rotationally ahead of the orienting surface.

DRAWINGS

DETAILED DESCRIPTION

Figure 1:
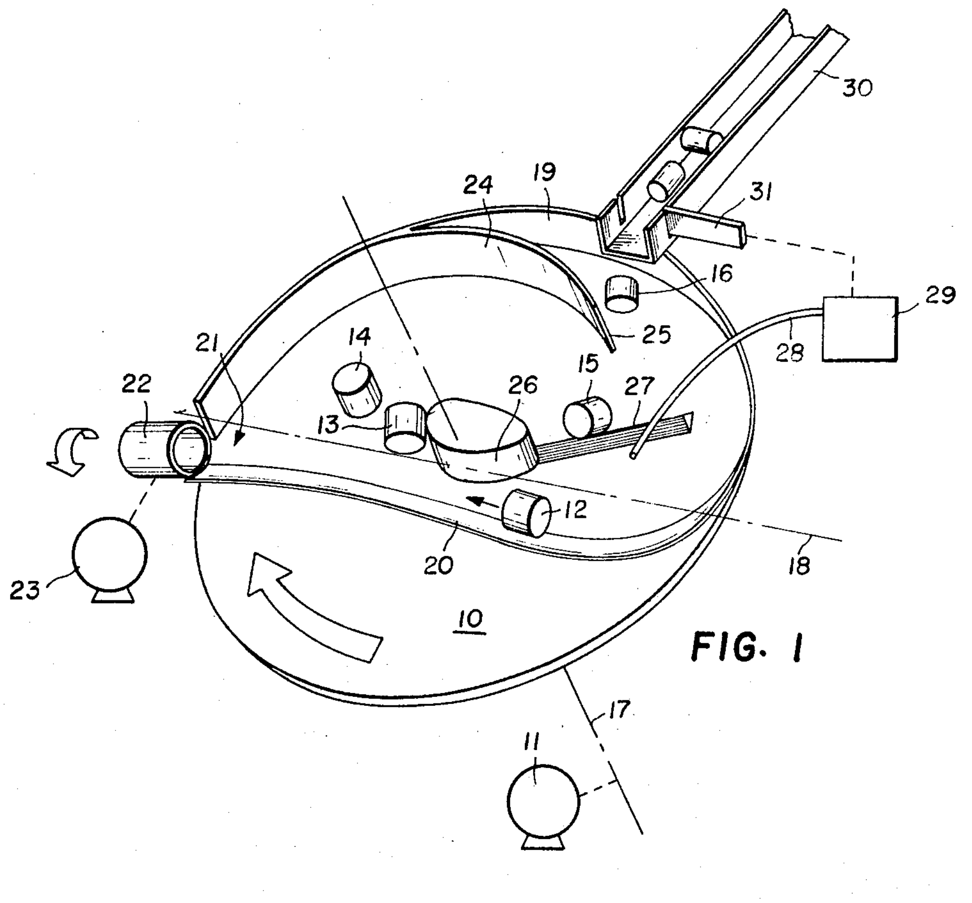
FIG. 1 is a perspective and partially schematic view of a preferred embodiment of the inventive feeder.
Figure 2:
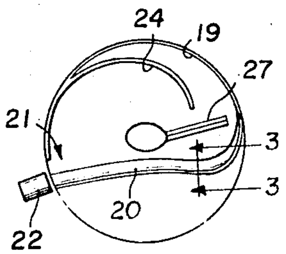
FIG. 2 is a plan view of the feeder of FIG. 1.

For simplicity, the preferred embodiment of the inventive feeder is illustrated schematically in the drawings. The invention is easy to understand when unencumbered by the details of motors, drive trains, bearings, input devices, etc. which are all generally known and easily supplied by those skilled in the art.

Disk 10 is rotated by motor 11 in the direction of the arrow around the perpendicular axis of rotation 17 which is tilted from the vertical on axis 18 by preferably 10° to 15° so that the top surface of disk 10 slopes 10° to 15° from the horizontal. Such tilting is exaggerated in FIG. 1 to show more clearly how the inventive device works.

Objects 12–16 are tumbled down input chute 30 and dropped in random orientation onto disk 10 in the region of object 16 on the upper part of disk 10. From such input region, objects 12–16 tend to roll downhill and to the right across rotating disk 10. Various guide, barrier, and tripping surfaces are fixed in place close to the top surface of disk 10 as illustrated, to control the movement of objects 12–16.

Figure 3:
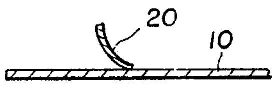
FIG. 3 is a partial cross section of the feeder of FIG. 2 taken along the line 3—3 thereof.

A peripheral wall 19 keeps objects from falling over the periphery of disk 10, and an orienting surface 20 curves inward from peripheral wall 19 in the direction of rotation of disk 10 and extends across the lower region of disk 10 to discharge region 21 where orienting surface 20 is approximately radial to disk 10. Orienting surface 20 slopes away from the axis of rotation 17 as illustrated, and is preferably curved in cross section as best shown in FIG. 3.

Objects rolling radially outward and rotationally ahead of orienting surface 20 tend to be guided to the position of object 12 where they have rolling contact with disk 10 and rotationally sliding contact with orienting surface 20. Because the rolling contact with disk 10 produces little friction, objects so oriented tend to stay in contact with orienting surface 20 and to move along orienting surface 20 in an end-to-end relationship toward discharge region 21. The approximately radial direction of orienting surface 20 at discharge region 21 tends to slow the objects down, as faster rotation of disk 10 tends to speed them up.

Discharge tube 22 is aligned with orienting surface 20 at discharge region 21 and is preferably rotated by motor 23 in the direction of the arrow so that rotation of discharge tube 22 matches the rotation of objects rolling against orienting surface 20. This facilitates the passing of objects into discharge tube 22 from orienting surface 20, and also, rotation of discharge tube 22 helps to tumble or thrust aside any objects that are improperly oriented for entry into tube 22.

Objects such as standing object 14 and tangential object 13 have sufficient frictional contact with disk 10 so that they are carried upward away from orienting surface 20 and discharge region 21 and over the upper part of disk 10 for another try at proper orientation. This lets only properly oriented objects approach discharge tube 22, and improperly oriented objects are guided and tumbled toward a new pass at orienting surface 20.

A fixed tripping rod 27 extends generally radially of disk 10 rotationally ahead of the curved portion of orienting surface 20. Rod 27 is positioned close to the top surface of disk 10 and is fairly low so that standing objects such as object 14 are tumbled or tripped over rod 27 as illustrated by object 15. Rod 27 thus upsets standing objects and tumbles or rolls all objects toward an orientation likely to result in the orientation of object 12 against orienting surface 20.

A barrier surface 26 is arranged around the axis 17 in the central region of disk 10 to keep objects away from the dead spot in the central region of disk 10. Barrier surface 26 is close to axis 17 on the lower side of disk 10 to allow orienting surface 20 to pass close to axis 17 just below the central region of disk 10. Barrier surface 26 extends further from axis 17 in the direction of tripping rod 27 to force objects to tumble further outward over tripping rod 27 toward the curved portion of orienting surface 20.

Rotationally beyond discharge region 21, a fixed guide surface 24 curves inward from the periphery of disk 10 in the direction of rotation of disk 10 and extends to a free end 25 that is rotationally ahead of orienting surface 20. Preferably the input region of object 16 beneath chute 30 is between peripheral wall 19 and guide surface 24. Improperly oriented objects such as standing object 14 and tangential object 13 frictionally engage disk 10 and are carried over the upper part of disk 10. These are guided by surface 24 to pass inside the stream of objects being fed from chute 30 and over tripping rod 27 for another try at proper orientation.

A sensing probe 28 is positioned above the curved inlet region for orienting surface 20 and is connected to a time-delay control 29 to sense an over supply of objects. Steady deflection of probe 28 for a sufficient length of time indicates clogging of objects at the inlet region of orienting surface 20 and causes control 29 to close a gate 31 in chute 30 to stop the input of objects. When probe 28 returns to its normal position as objects are discharged from disk 10, controller 29 opens gate 31 for resumed flow of objects from chute 30.

The inventive device can be formed in many sizes and configurations and made of many suitable materials. It can be tilted at different angles and driven at different speeds for different sized objects and different desired feeding rates. The supporting equipment and motor drives and probe-control equipment can be varied widely and the invention can be used for feeding many generally cylindrical objects including roller bearings, closed-coil springs, pieces of tubing, etc.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, the disk and the guiding and orienting surfaces can have many different shapes and surfaces, and those skilled in the art will understand many variations that can be accomplished within the general inventive principles.

I claim:

1. A device for orienting and feeding generally cylindrical objects, said device comprising:

a. a disk having a generally smooth and continuous top surface;

b. means for rotating said disk about the perpendicular axis of said disk;

c. means for tilting said disk from the horizontal;

d. means for dropping said objects onto the upper region of said top surface of said disk;

e. means for generally confining said objects within the periphery of said disk;

f. a fixed orienting surface close to said top surface of said disk and curving inward from said periphery in the direction of rotation of said disk and extending across the lower region of said disk to a discharge region where said orienting surface is approximately radial to said disk so that those of said objects that are oriented radially of said disk for rolling engagement with said disk move axially along said orienting surface; and g. a discharge tube aligned with said orienting surface at said discharge region and extending beyond said disk periphery to receive said objects.

2. The device of claim 1 including means for rotating said discharge tube.

3. The device of claim 1 wherein said orienting surface slopes away from said axis of rotation of said disk.

4. The device of claim 3 wherein said orienting surface is curved in cross section.

5. The device of claim 1 including a fixed guide surface close to said top surface of said disk and curving inward from said periphery in the direction of rotation of said disk and extending from rotationally beyond said discharge region to a free end rotationally ahead of said orienting surface.

6. The device of claim 5 wherein said dropping means is disposed between said guide surface and said periphery of said disk.

7. The device of claim 1 wherein said tilt of said disk from the horizontal is from 10° to 15°.

8. The device of claim 1 including a barrier surface close to said top surface of said disk and arranged for keeping said objects away from the central region of said disk.

9. The device of claim 1 wherein said orienting surface passes close to the central region of said disk.

10. The device of claim 1 wherein a tripping rod close to said top surface of said disk is arranged rotationally ahead of said orienting surface.

11. The device of claim 5 including a barrier surface close to said top surface of said disk and arranged for keeping said objects away from the central region of said disk.

12. The device of claim 11 wherein a tripping rod close to said top surface of said disk is arranged rotationally ahead of said orienting surface.

13. The device of claim 12 including means for rotating said discharge tube.

14. The device of claim 13 wherein said orienting surface passes close to said central region of said disk and slopes away from said axis of rotation of said disk and is curved in cross section.

15. The device of claim 14 wherein said tilt of said disk from the horizontal is from 10° to 15°, and said dropping means is disposed between said guide surface and said periphery of said disk.

16. The device of claim 15 including a probe device disposed in the region of the beginning of said orienting surface and arranged for stopping said dropping means upon detection of an over supply of said objects on said disk.

* * * * *